US012417718B1

(12) United States Patent
DeFrank

(10) Patent No.: US 12,417,718 B1
(45) Date of Patent: Sep. 16, 2025

(54) TAPE ADHESIVE TAG WITH TAB SYSTEM

(71) Applicant: Dominic DeFrank, Canyon Country, CA (US)

(72) Inventor: Dominic DeFrank, Canyon Country, CA (US)

( * ) Notice: Subject to any disclaimer, the term of this patent is extended or adjusted under 35 U.S.C. 154(b) by 257 days.

(21) Appl. No.: 18/478,864

(22) Filed: Sep. 29, 2023

Related U.S. Application Data

(60) Provisional application No. 63/469,497, filed on May 29, 2023.

(51) Int. Cl.
*B32B 3/10* (2006.01)
*G09F 3/10* (2006.01)
*G09F 3/02* (2006.01)

(52) U.S. Cl.
CPC ........ *G09F 3/10* (2013.01); *G09F 2003/0208* (2013.01)

(58) Field of Classification Search
CPC .... C09J 2301/18; C09J 7/20; C09J 2301/204; C09J 2203/334; C09J 2400/263; C09J 7/21; C09J 2301/308; C09J 7/30; C09J 7/403; C09J 2301/124; C09J 2301/162; C09J 2301/21; C09J 2423/046; C09J 2427/005; C09J 2467/006; C09J 7/10; C09J 7/203; C09J 7/29; C09J 7/38; G09F 3/10; G09F 3/0288
See application file for complete search history.

(56) References Cited

U.S. PATENT DOCUMENTS

| | | | | |
|---|---|---|---|---|
| 2,815,595 | A * | 12/1957 | Davis | G09F 3/10 40/641 |
| 3,767,039 | A | 10/1973 | Schroter | |
| 4,562,102 | A | 12/1985 | Rabuse | |
| 5,366,087 | A | 11/1994 | Bane | |
| 5,496,605 | A | 3/1996 | Augst | |
| 5,616,387 | A | 4/1997 | Augst | |
| 6,037,042 | A | 3/2000 | Kato | |
| 6,139,932 | A | 10/2000 | Kline | |
| 6,277,458 | B1 | 8/2001 | Dirksing | |
| 6,541,089 | B1 | 4/2003 | Hamerski | |
| 6,641,910 | B1 | 11/2003 | Bries | |
| 6,756,102 | B1 | 6/2004 | Galo | |
| 7,824,753 | B2 | 11/2010 | Bartusiak | |
| 9,339,417 | B2 | 5/2016 | Ogawa | |

(Continued)

*Primary Examiner* — Shin H Kim
(74) *Attorney, Agent, or Firm* — QuickPatents; Kevin Prince

(57) ABSTRACT

A roll of adhesive tags, each formed from a rectangular section of adhesive tape, each have a lower end, an upper end, a left side, a right side, a front surface, and a rear surface that has an adhesive layer applied thereto. The upper end terminates at a first perforation, and the lower end terminates at a second perforation. The front surface includes an angled indicia adjacent to the first perforation to define a rear isosceles right triangle and a front isosceles right triangle. The angled indicia corresponds with a common hypotenuse of each of the rear isosceles right triangle and the front isosceles right triangle. The front surface is further configured for accepting writing or marking thereon. As such, the rear isosceles right triangle is folded along the angled indicia to form a non-adhesive triangular tab wherein the first perforation is aligned with one side of the adhesive tape.

18 Claims, 9 Drawing Sheets

(56) References Cited

U.S. PATENT DOCUMENTS

| | | | | |
|---|---|---|---|---|
| 10,913,630 | B2 | 2/2021 | Chern | |
| 2003/0211273 | A1 | 11/2003 | Perry | |
| 2006/0003129 | A1 * | 1/2006 | Thiele | C09J 7/20 428/40.1 |
| 2007/0059475 | A1 | 3/2007 | Dunn | |
| 2008/0163973 | A1 * | 7/2008 | Euse | G09F 3/0288 156/62 |
| 2010/0059162 | A1 * | 3/2010 | Flanigan | B44D 3/225 156/60 |
| 2021/0047544 | A1 | 2/2021 | Schwartz | |
| 2022/0306907 | A1 | 9/2022 | Prince | |
| 2022/0363950 | A1 | 11/2022 | Crisan | |

* cited by examiner

TAPE ADHESIVE TAG WITH TAB SYSTEM

CROSS REFERENCE TO RELATED APPLICATIONS

This application claims the benefit of U.S. Provisional Patent Application 63/469,497, filed on May 29, 2023, and incorporated herein by reference.

STATEMENT REGARDING FEDERALLY SPONSORED RESEARCH AND DEVELOPMENT

Not Applicable.

FIELD OF THE INVENTION

This invention relates to adhesive tape, and more particularly to a roll of adhesive tape tags with pull tabs.

BACKGROUND

When working with a plurality of camera memory cards, or other objects that need to be either marked-up or tagged, handling separate tags or adhesive stickers can be time consuming and cumbersome. In such circumstances, handling the object to be marked and the tag or sticker usually required a person to use both hands to write-up the tag or sticker, and then peel the sticker away from a backing, and then apply the tag to the object.

When working with a roll of tape suitable for applying to the objects, the person must typically write on the tape, pick at the tape edge that has usually adhered back down onto the roll, sometimes tearing when peeled unevenly, then pull and tear a section of the tape away from the roll, and apply the tape segment with the writing or markings to the object. Meanwhile the edge of the tape has again adhered to the roll, which must be picked at once again when it comes time for the next section to be removed, which can also make the picked edge of the tape appear ragged or ripped and untidy.

Another issue is the inconsistency of lengths of sections removed by individual user's preference and "eye" estimation, one at a time. If the tape doesn't tear at an intended location, landing too short can sometimes tear through pre filled writing, or more typically the tape is torn too long to compensate and ensure any pre written labeling is more than safe, which leads to unnecessary waste and more importantly overall inconsistency. A primary goal for a solution to this problem is to increase consistency and organization. Combining the hassle of picking and peeling the ever stuck edge of tape at the start of the roll, with the ragged appearance of that edge once it is removed, with the inconsistency of the lengths and uneven torn edges that are sometimes created when tearing a tape tag from a roll, the result is tape tags with a non-uniform length and appearance that tend to be more difficult to handle as they are applied, removed and re-applied as part of their function. This can add extra time to what can be an already time consuming process.

Therefore, there is a need for a tape roll innovation that will allow the users to easily and consistently grab, pull and remove tags of congruent length from a roll of tape, folding the tape section or adhesive tag to produce a portion of the next tag that is not adhesive and will not re-stick to the roll of tape, while providing an easily torn perforation for the tag that detaches from the roll easily. Such a needed invention allows the user to also hold the marking pen or implement in the hand not holding the roll of tape, while applying the marked-up adhesive tag to the object, while never having to release the roll of tape or marking implement. Such a needed invention would provide for more efficient marking of objects such as camera memory cards, merchandise to be priced, inventory control tags, and the like. The present invention accomplishes these objectives.

SUMMARY OF THE INVENTION

The present device is a roll of adhesive tags, each formed from a rectangular section of adhesive tape. Each rectangular section has a lower end, an upper end, a left side, a right side (collectively referred to as two sides), a front surface, and a rear surface that has an adhesive layer applied thereto. The upper end terminates at a first perforation, and the lower end terminates at a second perforation. The first perforation and the second perforation are collectively referred to as the perforations, of which there are many in the roll of the plurality of adhesive tags, each of which is separated by one of the perforations.

The front surface includes an angled indicia adjacent to the first perforation to define a rear isosceles right triangle and a front isosceles right triangle. The angled indicia corresponds with a common hypotenuse of each of the rear isosceles right triangle and the front isosceles right triangle. The front surface is further configured for accepting writing or marking thereon.

As such, the rear isosceles right triangle is folded along the angled indicia so that a rear surface of the rear isosceles right triangle contacts and adheres to a rear surface of the front isosceles right triangle, thereby forming a non-adhesive triangular tab wherein the first perforation is aligned with one side of the adhesive tape. In some embodiments, the rear isosceles right triangle is shaded in a contrasting color to that of the front isosceles right triangle. For example, the front isosceles right triangle may be shaded black while the rear isosceles right triangle maintains a natural color of the adhesive tape, such as white or other color that visually contrasts with black. An interface between the rear isosceles right triangle and the front isosceles right triangle thereby defines the angled indicia.

The front surface of each rectangular section preferably includes indicia associated with camera memory cards, but can also be associated with alternate uses. The adhesive layer may be a low-tack adhesive such as made popular by 3M's Post-It Notes products, a middle-tack adhesive, or a high-tack adhesive, depending on a desired application. Each adhesive tag can be quickly filled-out or otherwise written on, folded over itself to form the non-adhesive triangular tab, and pulled away from the roll at one of the perforations to stage a next adhesive tag. The next adhesive tag is easily pulled away from the roll due to the non-adhesive triangular tab not being adhered to the roll. In this manner many of the adhesive tags can be completed, removed, and applied to an object such as the camera memory cards, or other objects that need adhesive tags.

The roll of adhesive tags may further including a dead space between the first perforation and the angled indicia, whereby when the rear isosceles right triangle is folded behind the front isosceles right triangle, the dead space presents with the adhesive layer towards the front surface of the tag to the side of the non-adhesive triangular tab, whereby multiple of the tags may be separated from the roll of adhesive tags and temporarily affixed to each other at their dead zones to facilitate management of the tags. For example, a stack of such removed tags may be affixed to a surface, and if the non-adhesive triangular tabs were not stuck to each other at their dead zones, the non-adhesive triangular tabs would be bent outwardly and possibly interfere with their intended use. Having the non-adhesive triangular tabs stick to each other maintains order in the stack of tags.

The roll of adhesive tags may further include a third perforation below the non-adhesive triangular tab, whereby the non-adhesive triangular tab may be torn away from the tag at the third perforation. Further, a fourth perforation may be included for breaking the tag into two or more separate sub-tags having different indicia associated with perhaps related items but still different items, such as a memory card and a memory card case.

A method of producing such adhesive tags comprises providing the roll as taught above. First a user writes or marks-up the next adhesive tag. Next, the adhesive tag is pulled away from the roll by grasping the non-adhesive triangular tab and folding the next rectangular section and the connected rear isosceles right triangle along the angled indicia so that a rear surface of the rear isosceles right triangle contacts and adheres to the rear surface of the front isosceles right triangle, thereby forming the non-adhesive triangular tab of the next adhesive tag, the first perforation being aligned with one of the sides of the adhesive tape. Next, the adhesive tag is torn away from the rear isosceles right triangle at the first perforation to form the adhesive tag as separated from the roll. The cycle repeats, the next adhesive tag now becoming the adhesive tag in the next cycle.

The present invention is a tape roll innovation that allows the user to easily and consistently grab, pull and remove tags of congruent length from a roll of tape, fold the tape section or adhesive tag to produce a portion of the next tag that is not adhesive and will not re-stick to the roll of tape, and provide an easily torn perforation for the tag that detaches from the roll. The present invention allows the user to hold the marking pen or implement in the hand not holding the roll of tape, while applying the marked-up adhesive tag to the object, while never having to release the roll of tape or marking implement. The present invention provides for more efficient marking of objects such as camera memory cards, merchandise to be priced, inventory control tags, and the like.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
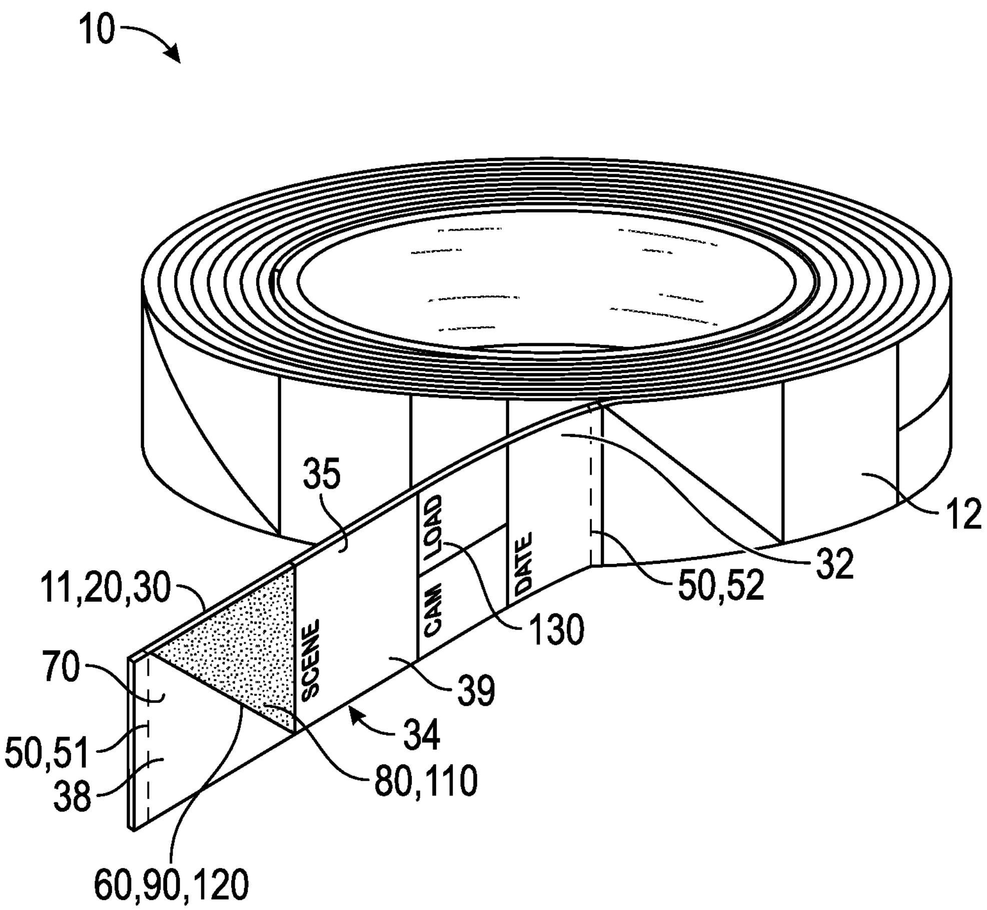
FIG. 1 is a perspective view of the invention.
Figure 2:
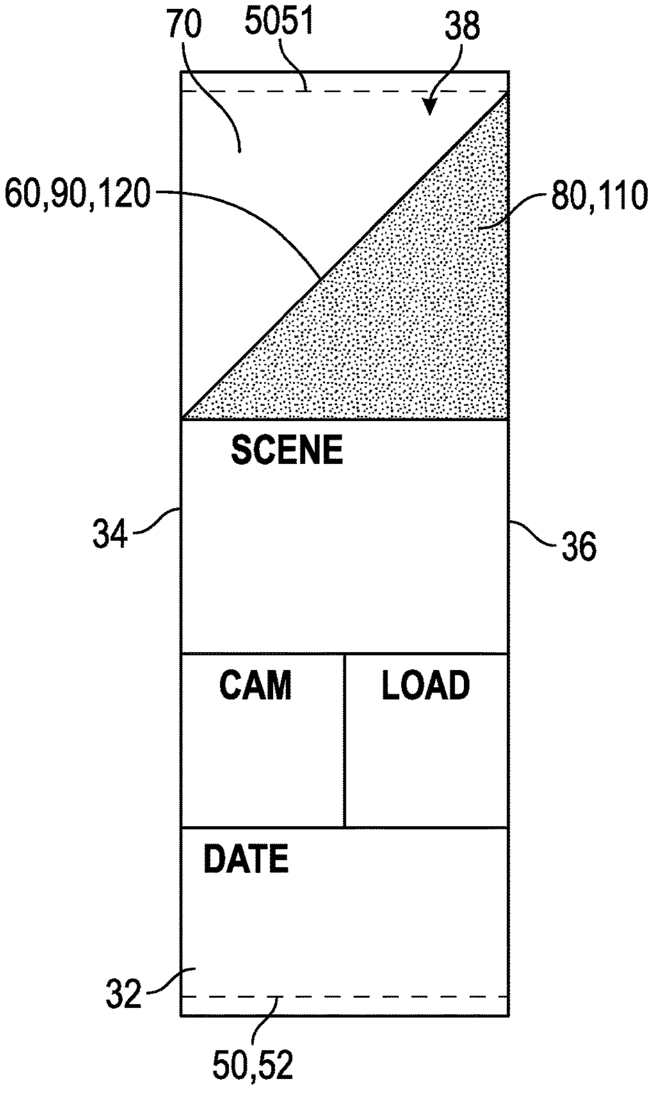
FIG. 2 is a front elevational view of the invention.
Figure 3:
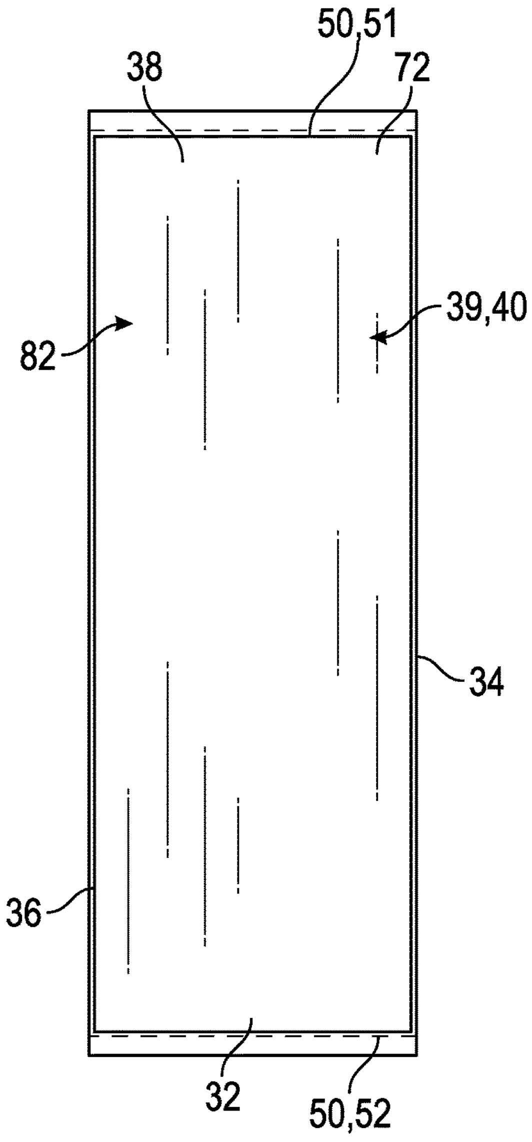
FIG. 3 is a rear elevational view of the invention.

FIGS. 1-3 illustrate a roll 10 of adhesive tags 11, each formed from a rectangular section 30 of adhesive tape 20. Each rectangular section 30 has a lower end 32, an upper end 38, a left side 34, a right side 36 (collectively referred to as two sides 35), a front surface 31, and a rear surface 39 that has an adhesive layer 40 applied thereto. The upper end 38 terminates at a first perforation 51, and the lower end 32 terminates at a second perforation 52. The first perforation 51 and the second perforation 52 are collectively referred to as the perforations 50, of which there are many in the roll 10 of the plurality of adhesive tags 11, each of which is separated by one of the perforations 50.

Figure 4:
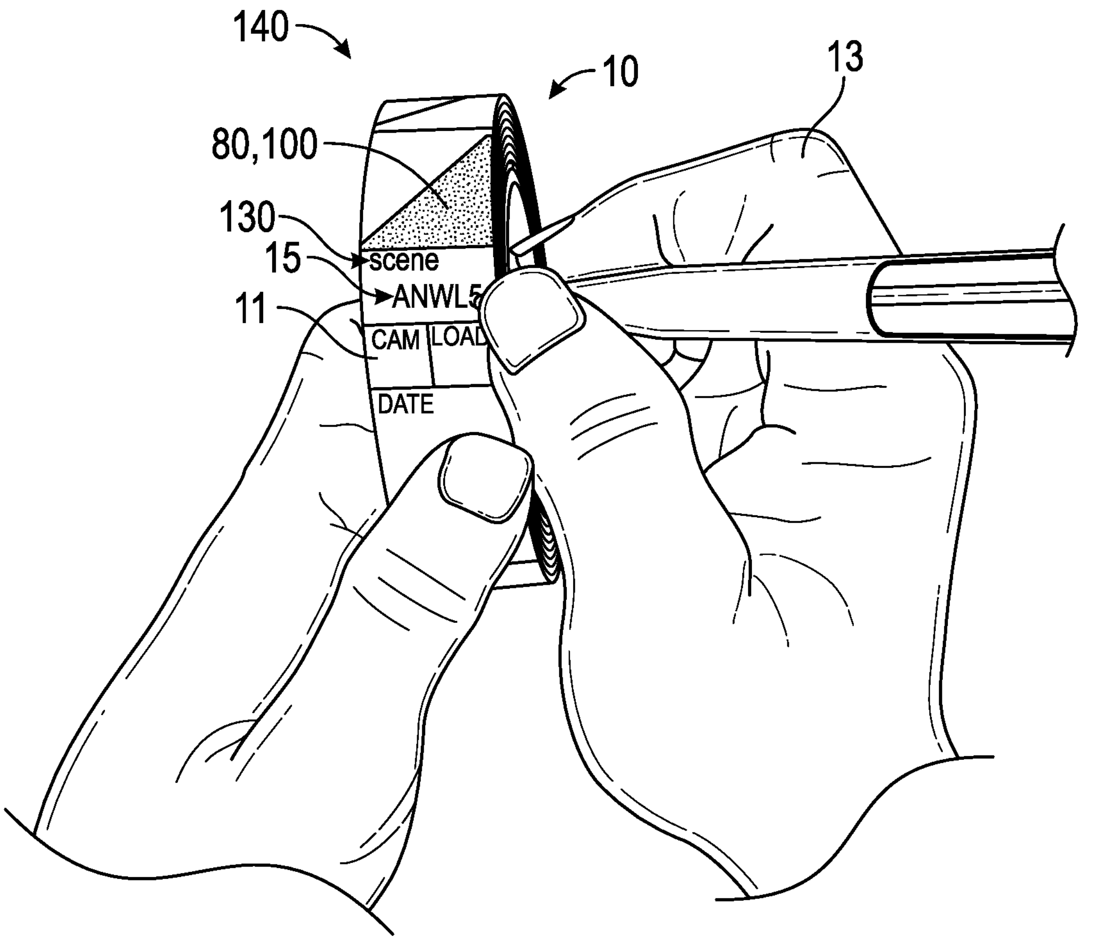
FIG. 4 is a perspective view of a person writing on an adhesive tag of the invention.

The front surface 31 includes an angled indicia 60 adjacent the first perforation 51 to define a rear isosceles right triangle 70 and a front isosceles right triangle 80. The angled indicia 60 corresponds with a common hypotenuse 90 of each of the rear isosceles right triangle 70 and the front isosceles right triangle 80. The front surface 31 is further configured for accepting writing 15 thereon (FIG. 4).

As such, the rear isosceles right triangle 70 is folded along the angled indicia 60 so that a rear surface 72 of the rear isosceles right triangle 70 contacts and adheres to a rear surface 82 of the front isosceles right triangle 80, thereby forming a non-adhesive triangular tab 100 wherein the first perforation 51 is aligned with one side 35 of the adhesive tape 20. In some embodiments, the rear isosceles right triangle 70 is shaded in a contrasting color 110 to that of the front isosceles right triangle 80. For example, the front isosceles right triangle 80 may be shaded black while the rear isosceles right triangle 70 maintains a natural color of the adhesive tape 20, such as white or other color that visually contrasts with black. An interface 120 between the rear isosceles right triangle 70 and the front isosceles right triangle 80 thereby defines the angled indicia 60.

The front surface 31 of each rectangular section 30 preferably includes indicia 130 associated with camera memory cards, but can also be associated with alternate uses. The adhesive layer 40 may be a low-tack adhesive such as made popular by 3M's Post-It Notes products, a middle-tack adhesive, or a high-tack adhesive, depending on a desired application. Each adhesive tag 11 can be quickly filled-out or otherwise written on, folded over itself to form the non-adhesive triangular tab 100, and pulled away from the roll 10 at one of the perforations to stage a next adhesive tag 12. The next adhesive tag 12 is easily pulled away from the roll 10 due to the non-adhesive triangular tab 100 not being adhered to the roll 10. In this manner many of the adhesive tags 11 can be completed, removed, and applied to an object such as the camera memory cards, or other objects that need adhesive tags. For example, merchandise at a retail location can be quickly priced or discounted by a worker using the roll 10 and a marker such as an ink pen. A teacher can apply grades to a plurality of graded assignments quickly, as well, allowing the assignments to not be marked-up but rather preserved in their original form. Other examples of applications for quickly labeling or tagging objects can be readily found, the roll 10 of adhesive tags 11 of the present invention making such marking or tagging of objects more efficient than prior art solutions.

Figure 9:
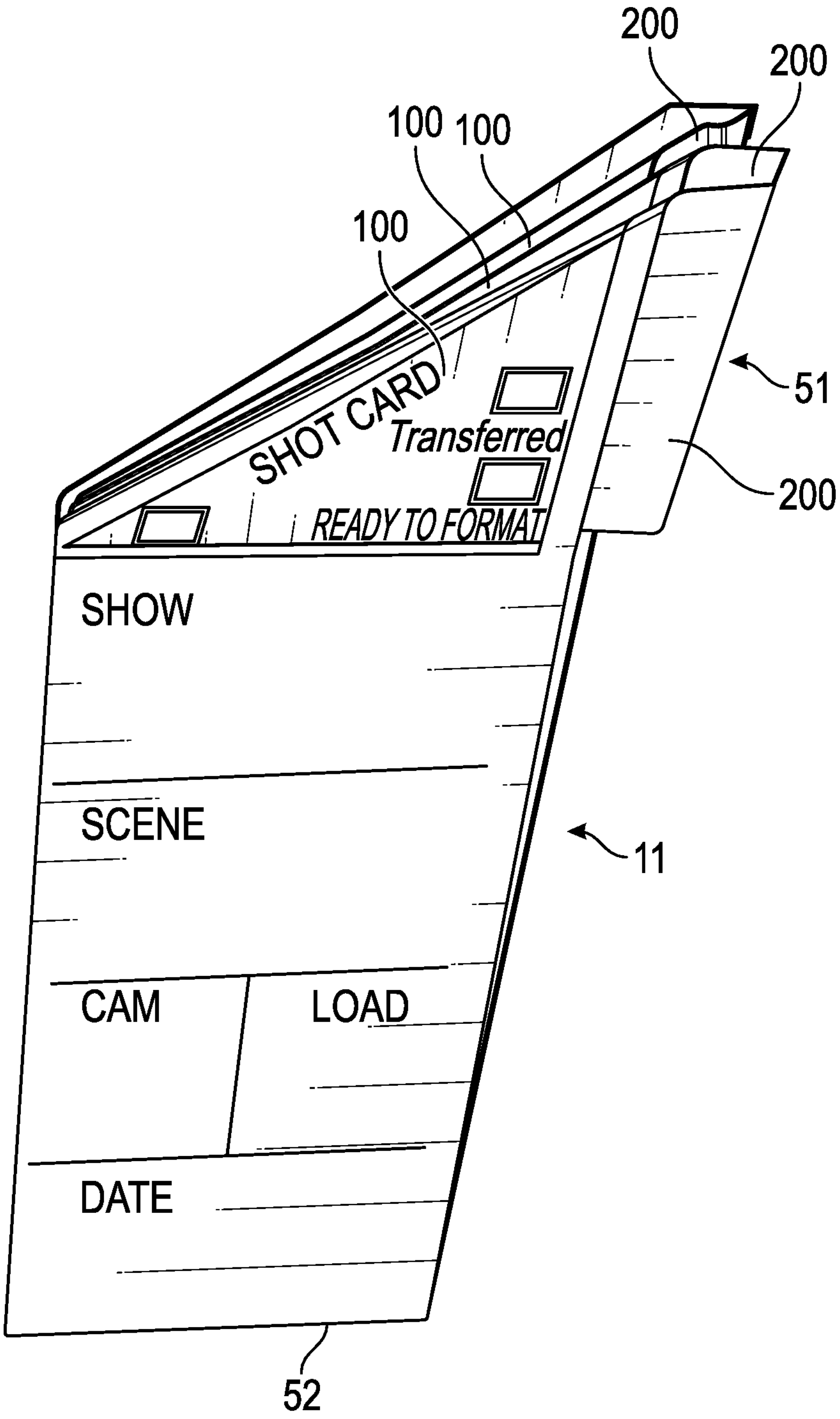
FIG. 9 is a front perspective view of a stack of tabs mutually temporarily affixed at dead zones of the adhesive tape.

The roll 10 of adhesive tags 11 may further including a dead space 200 (FIG. 9) between the first perforation 51 and the angled indicia 60, whereby when the rear isosceles right triangle 70 is folded behind the front isosceles right triangle 80, the dead space 200 presents with the adhesive layer 40 towards the front surface 31 of the adhesive tag 11 to the side of the non-adhesive triangular tab 100, whereby multiple of the adhesive tags 11 may be separated from the roll 10 of adhesive tags 11 and temporarily affixed to each other at their dead space 200 to facilitate management of the adhesive tags 11. For example, a stack of such removed adhesive tags 11 may be affixed to a surface, and if the non-adhesive triangular tabs 100 were not stuck to each other at their dead space 200, the non-adhesive triangular tabs 100 would be bent outwardly and possibly interfere with their intended use.

Figure 8:
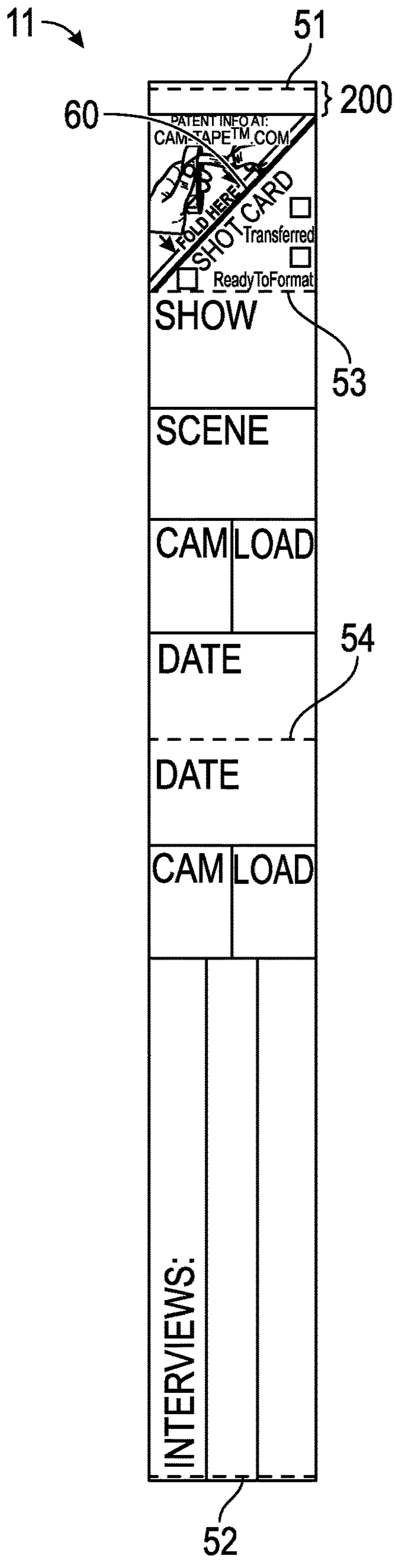
FIG. 8 is a front elevational view of an alternate embodiment of the tag.
Figure 10:
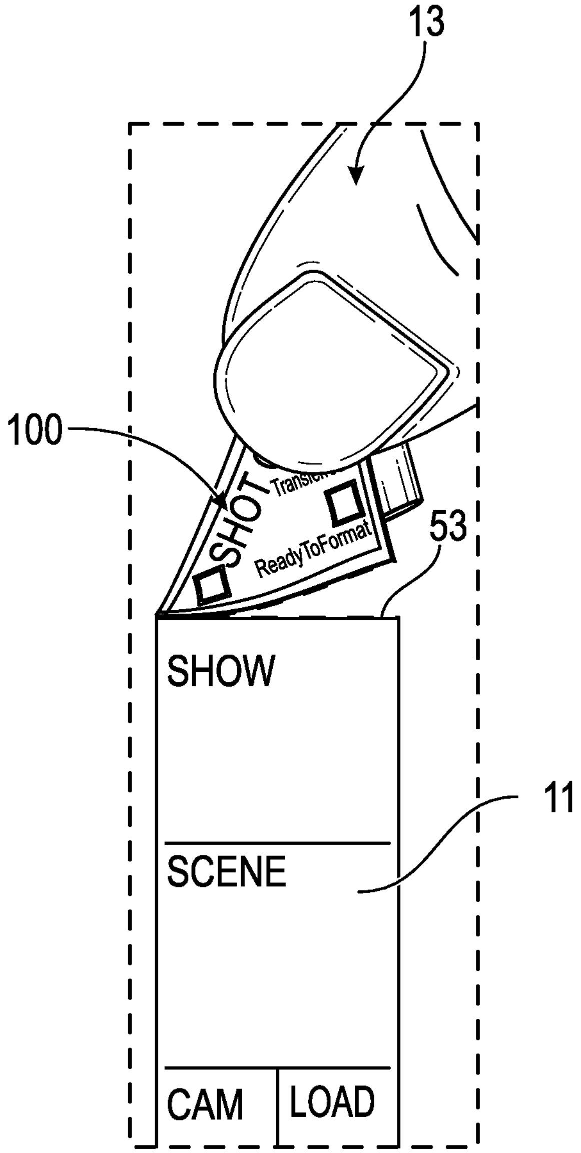
FIG. 10 is a front view of the non-adhesive triangular tab as being torn away from the tag at a third perforation.

The roll 10 of adhesive tags 11 may further include a third perforation 53 (FIGS. 8-10) below the non-adhesive triangular tab 100, whereby the non-adhesive triangular tab 100 may be torn away from the adhesive tag 11 at the third perforation 53. One advantage of adding the perforations 50, 51, 52, 53 is that when torn at such perforations 50, 51, 52, 53, the tape 20 is cleanly cut and forms a substantially straight cut line (FIG. 10). Further, a fourth perforation 54 may be included for breaking the adhesive tag 11 into two or more separate double tags 14 having different indicia 130 associated with perhaps related items but still different items, such as a memory card and a memory card case (not shown).

Figure 5:
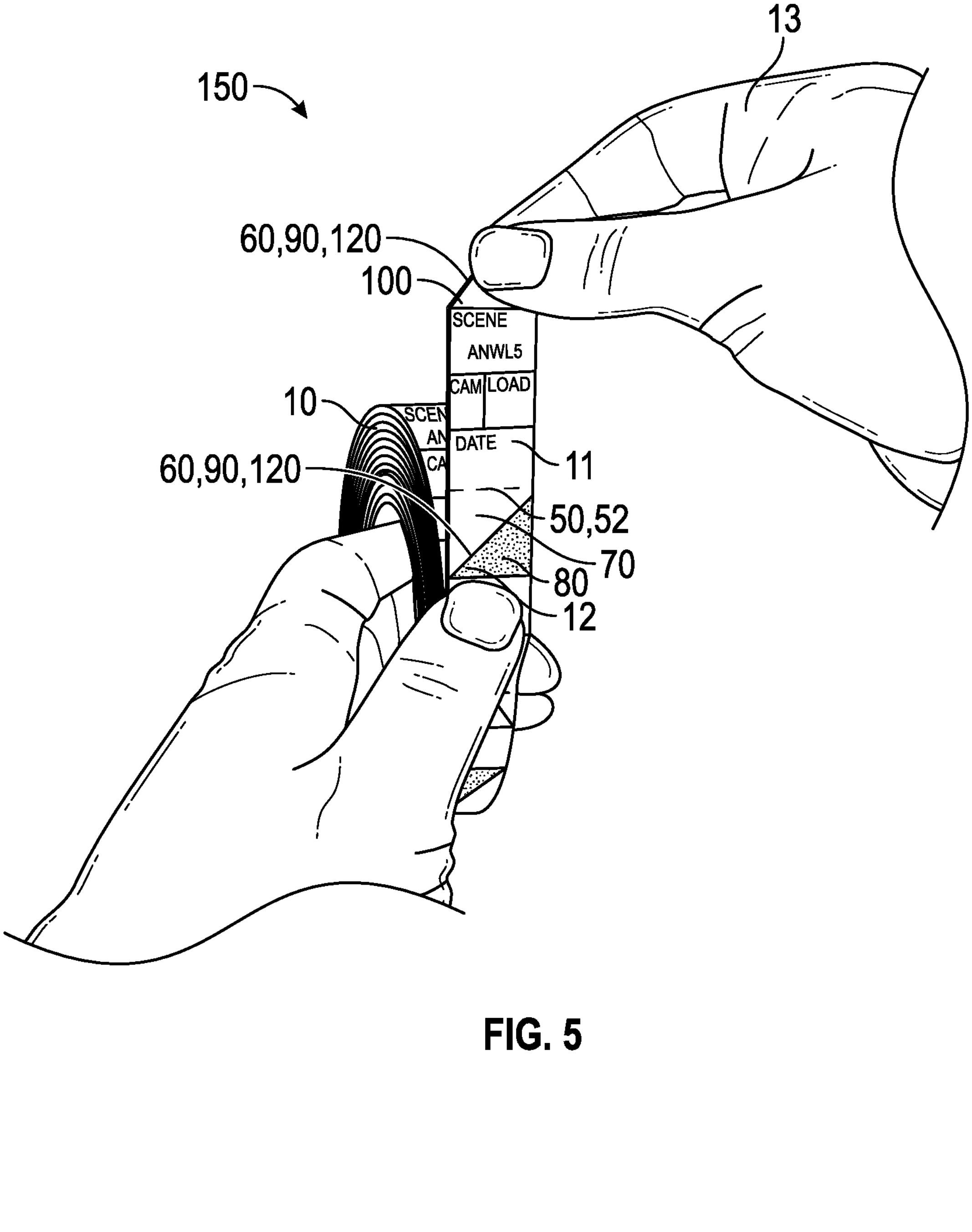
FIG. 5 is a perspective view of the person pulling the adhesive tag away from a roll of such adhesive tags.
Figure 6:
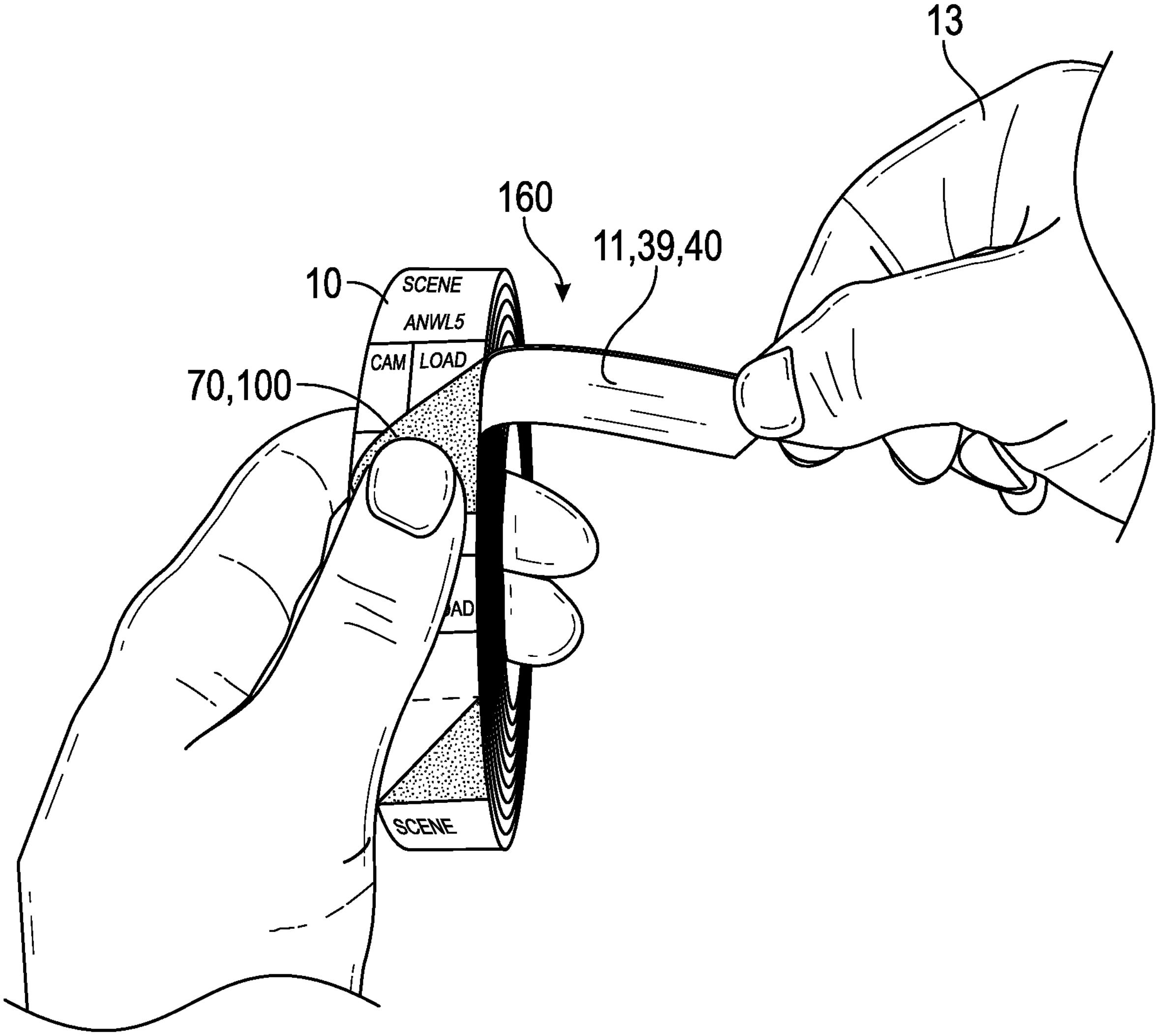
FIG. 6 is a perspective view of the person folding the adhesive tag of a next rectangular section of the roll back against itself to form a non-adhesive triangular tab.
Figure 7:
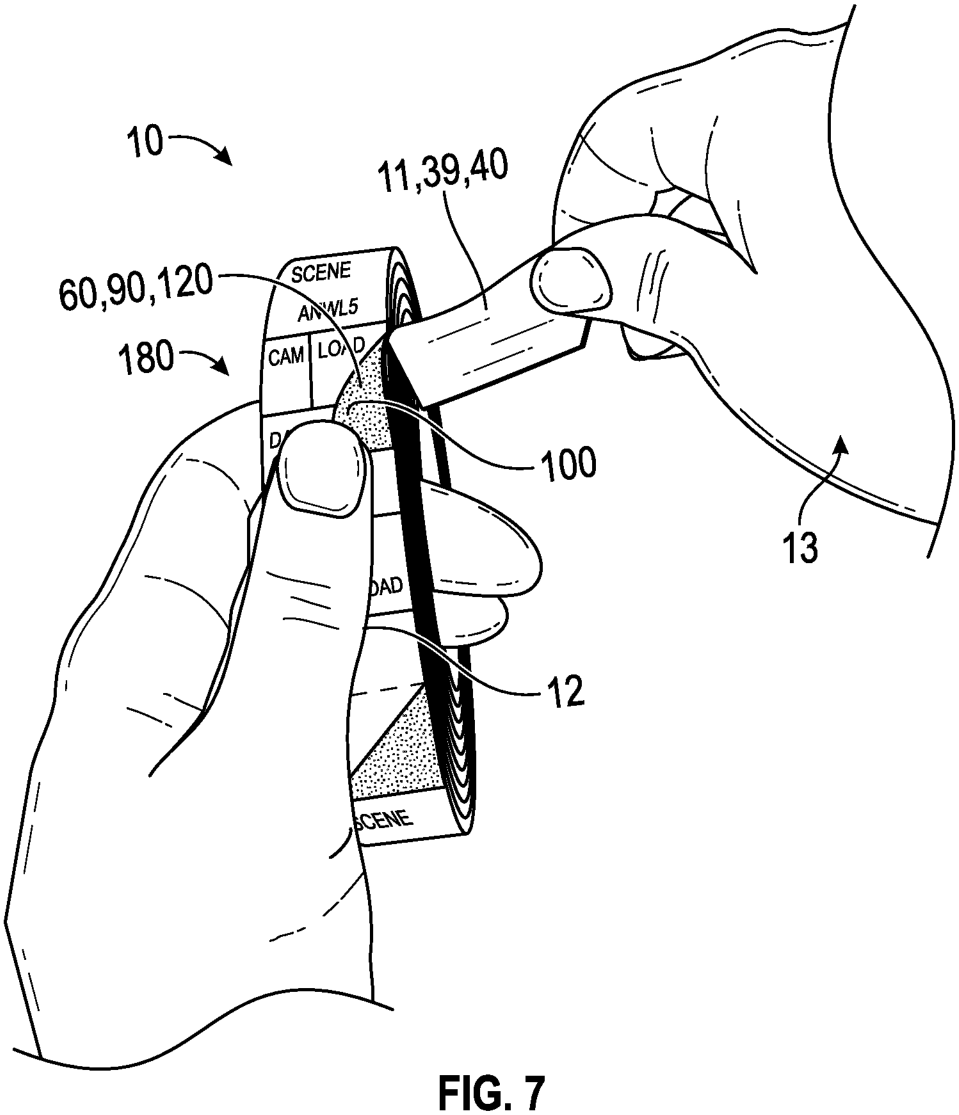
FIG. 7 is a perspective view of the person tearing the adhesive tag away from the next rectangular section of the roll.

A method of producing such adhesive tags comprises providing the roll 10 as taught above. In a step 140 (FIG. 4), a user 13 writes or marks-up the next adhesive tag 11. In a step 150 (FIG. 5), the adhesive tag 11 is pulled away from the roll 10 by grasping the non-adhesive triangular tab 100 and folding the next rectangular section 30 and the connected rear isosceles right triangle 70 along the angled indicia 60 so that a rear surface 72 of the rear isosceles right triangle 70 contacts and adheres to the rear surface 82 of the front isosceles right triangle 80 (FIG. 6), thereby forming the non-adhesive triangular tab 100 of the next adhesive tag 12, the first perforation 51 being aligned with one of the sides 35 of the adhesive tape 20. In a step 170 (FIG. 7), the adhesive tag 11 is torn away from the rear isosceles right triangle 70 at the first perforation 51 to form the adhesive tag 11 as separated from the roll 10. The cycle repeats, the next adhesive tag 12 now becoming the adhesive tag 11 in the next cycle. A step 180 may be further including, comprising pushing down on the non-adhesive triangular tab 100 of the next adhesive tag into the roll 10 to prevent unspooling of the next adhesive tag 12 when tearing the adhesive tag 11 away from the roll 10 in step 170.

While a particular form of the invention has been illustrated and described, it will be apparent that various modifications can be made without departing from the spirit and scope of the invention. For example, the angled indicia 60 meets the perforation 50 at the right side 36 of the adhesive tape 20 in the illustrations, as is most-suited for use with right-handed users 13. However, the angled indicia 60 could also meet the perforation 50 at the left side 34 of the adhesive tape 20, which is more suitable for use with left-handed users 13. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An adhesive tag comprising:

a rectangular section of adhesive tape having a lower end, an upper end, two sides, a front surface, and a rear surface having an adhesive layer applied thereto, the upper end terminating at a first perforation, the lower end terminating at a second perforation, the front surface including an angled indicia adjacent the first perforation to define a rear isosceles right triangle and a front isosceles right triangle, the angled indicia corresponding with a common hypotenuse of each of the rear isosceles right triangle and a front isosceles right triangle, the front surface configured for accepting writing thereon;

whereby the rear isosceles right triangle is folded along the angled indicia so that a rear surface of the rear isosceles right triangle contacts and adheres to a rear surface of the front isosceles right triangle, thereby forming a non-adhesive triangular tab wherein the first perforation is aligned with one side of the adhesive tape.

2. The adhesive tag of claim 1 wherein the front isosceles right triangle is shaded in a contrasting color to that of the rear isosceles right triangle, wherein an interface between the rear isosceles right triangle and a front isosceles right triangle defines the angled indicia.

3. The adhesive tag of claim 2 wherein the front isosceles right triangle is shaded black and the rear isosceles right triangle maintains a color of the adhesive tape.

4. The adhesive tag of claim 3 wherein the color of the adhesive tape is white.

5. A roll of adhesive tags comprising:

a roll of adhesive tape separated into a plurality of sequentially-arranged rectangular sections at perforations, each rectangular section having a lower end, an upper end, a left side, a right side, a front surface, and a rear surface having an adhesive layer applied thereto, the front surface including an angled indicia adjacent one of the perforations to define a rear isosceles right triangle and a front isosceles right triangle, the angled indicia corresponding with a common hypotenuse of each of the rear isosceles right triangle and a front isosceles right triangle, the front surface configured for accepting writing thereon;

whereby one of the rectangular sections and a connected rear isosceles right triangle of an adjacent next rectangular section is folded along the angled indicia so that a rear surface of the rear isosceles right triangle contacts and adheres to a rear surface of the front isosceles right triangle, thereby forming a non-adhesive triangular tab wherein the first perforation is aligned with one side of the adhesive tape, the rectangular section then being torn away from the rear isosceles right triangle at the perforation to form the adhesive tag and stage the next adhesive tag by pulling the non-adhesive triangular tab away from the roll and repeating the process.

6. The roll of adhesive tags of claim 5 wherein the front isosceles right triangle of each rectangular section is shaded in a contrasting color to that of the adjacent rear isosceles right triangle, wherein an interface between the rear isosceles right triangle and a front isosceles right triangle defines the angled indicia.

7. The roll of adhesive tags of claim 6 wherein the front isosceles right triangle of each rectangular section is shaded black and the adjacent rear isosceles right triangle maintains a color of the adhesive tape.

8. The roll of adhesive tags of claim 7 wherein the color of the adhesive tape is white.

9. The roll of adhesive tags of claim 6 wherein the front side of each rectangular section includes indicia associated with camera memory cards.

10. The roll of adhesive tags of claim 6 wherein the adhesive is a low-tack adhesive.

11. The roll of adhesive tags of claim 6 wherein the adhesive is a medium-tack adhesive.

12. The roll of adhesive tags of claim 6 wherein the angled indicia meets the perforation at the right side.

13. The roll of adhesive tags of claim 6 wherein the angled indicia meets the perforation at the left side.

14. The roll of adhesive tags of claim 5 further including a dead space between the perforation and the angled indicia, whereby when the rear isosceles right triangle is folded behind the front isosceles right triangle, the dead space presents to the front surface of the tag to the side of the non-adhesive triangular tab, whereby multiple of the tags may be separated from the roll of adhesive tags and temporarily affixed to each other at their dead zones to facilitate management of the tags.

15. The roll of adhesive tags of claim 5 further including a third perforation below the non-adhesive triangular tab, whereby the non-adhesive triangular tab may be torn away from the tag at the third perforation.

16. The roll of adhesive tags of claim 5 further including a fourth perforation between the first perforation and the second perforation, whereby the tag forms a double tag.

17. A method of producing adhesive tags comprising the steps:

a) providing a roll of adhesive tape separated into a plurality of sequentially-arranged rectangular sections at perforations, each rectangular section having a lower end, an upper end, a left side, a right side, a front surface, and a rear surface having an adhesive layer applied thereto, the front surface including an angled indicia adjacent one of the perforations to define a rear isosceles right triangle and a front isosceles right triangle, the angled indicia corresponding with a common hypotenuse of each of the rear isosceles right triangle and a front isosceles right triangle, the front surface configured for accepting writing thereon;

b) writing on the front surface of a next rectangular section on the roll;

c) pulling the non-adhesive triangular tab away from the roll to release the next rectangular section, the connected rear isosceles right triangle, and the connected front isosceles right triangle from the roll;

d) folding the next rectangular section and a connected rear isosceles right triangle of an adjacent next rectangular section along the angled indicia so that a rear surface of the rear isosceles right triangle contacts and adheres to a rear surface of the front isosceles right triangle, thereby forming a non-adhesive triangular tab with the first perforation being aligned with one of the sides of the adhesive tape;

f) tearing the rectangular section away from the rear isosceles right triangle at the perforation to form the adhesive tag; and g) repeating from step b).

18. The method of claim 17 furthering including the step:

e) pushing down on the non-adhesive triangular tab of the next adhesive tag into the roll to prevent unspooling of the next adhesive tag.

* * * * *